UNITED STATES PATENT OFFICE.

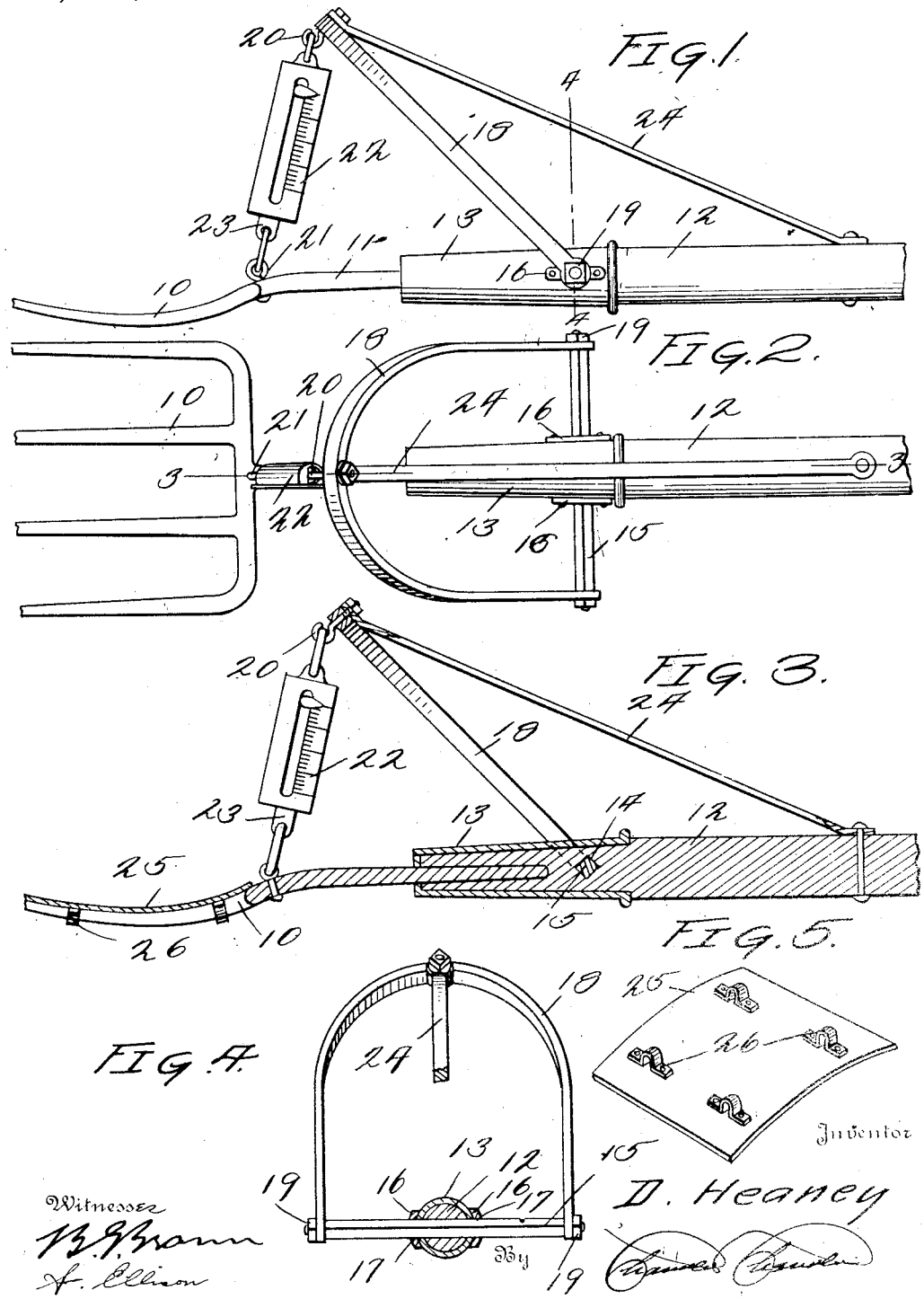

DAVID HEANEY, OF TROY, PENNSYLVANIA.

WEIGHING DEVICE FOR FORKS OR SHOVELS.

1,210,644.  Specification of Letters Patent.  Patented Jan. 2, 1917.

Application filed April 21, 1916. Serial No. 92,711.

*To all whom it may concern:*

Be it known that I, DAVID HEANEY, a citizen of the United States, residing at Troy, in the county of Bradford, State of Pennsylvania, have invented certain new and useful Improvements in Weighing Devices for Forks or Shovels; and I do hereby declare the following to be a full, clear, and exact description of the invention, such as will enable others skilled in the art to which it appertains to make and use the same.

This invention relates to improvements in weighing devices, and particularly to weighing devices for use in connection with forks or shovels which are used to handle hay or the like and grain or the like.

The principal object of the invention is to provide a novelly constructed fork or shovel in connection with which there is used a novelly mounted weighing scale.

Another object is to provide a device of this character in which the fork or shovel and the weighing device form the component parts of the unitary structure.

Other objects and advantages will be apparent from the following description when taken in connection with the accompanying drawing.

In the drawing: Figure 1 is a side elevation of a fork equipped with my improved weighing device; Fig. 2 is a top plan view; Fig. 3 is a longitudinal section on the line 3—3 of Fig. 2; Fig. 4 is a vertical section on the line 4—4 of Fig. 1; Fig. 5 is a perspective view of the plate which is applied to the fork head.

Referring particularly to the accompanying drawing, 10 represents the head of a hay fork which is formed with a tang or shank 11 engaged in the end of the handle 12. This handle is also provided with the usual ferrule 13, but it will be noted that the tang or shank extends to a suitable distance beyond the end of the handle and is resilient or springy in its nature. Formed transversely through the handle and ferrule is an opening 14, square in cross section and receiving therethrough a transversely extending squared shaft 15. On opposite sides of the ferrule are secured the plates 16 each having a squared opening 17 through which the said shaft 15 extends for the purpose of preventing axial movement of said shaft. An arched member 18 has the lower ends of its legs provided with square apertures which receive the ends of the shaft 15, suitable nuts 19 being engaged on the ends of the shaft to hold the arched member in proper position.

It will be noted that the arched member inclines upwardly toward the head of the fork, and in the central portion of the upper part of the arch which, as will be seen from the side elevation is disposed over the extended portion of the tang, is a hook 20. Carried by the head is a second hook 21, and engaged with the hook 20 is the upper end of the casing of the spring scales 22, while the spring plunger 23 of the scales is engaged with the hook 21. A suitable brace 24 is secured at its opposite ends respectively to the upper portion of the arched member 18 and to the handle 12.

In the operation of the device, when the fork is lifted with a load of hay or like material thereon, the weight of the material will cause the downward flexing of the shank 11, thus resulting in a downward pull of the plunger 23, and the registering of the weight on the scales 22.

To adapt the device for handling grain, I provide a metal plate 25 which is adapted to be disposed over the tines of the fork and which is provided with a plurality of eye members 26 through which the tines are inserted.

What is claimed is:

1. The combination with a fork, or like implement having a head formed with a resilient shank, a handle with which the shank is engaged, a member secured to the handle and extending over the shank, and a spring scale secured to the member and to the shank.

2. A weighing device comprising a fork or the like having a flexible attaching shank for the head thereof, a handle with which the shank is engaged, an arched member secured to the handle and inclining over the shank, means for preventing rocking movement of the arched member and a spring scale secured to and extending between the arched member and the shank.

In testimony whereof, I affix my signature, in the presence of two witnesses.

DAVID HEANEY.

Witnesses:
BLANCHE DEWEY,
J. C. BLACKWELL.